US011574639B2

(12) United States Patent
Kanda et al.

(10) Patent No.: US 11,574,639 B2
(45) Date of Patent: Feb. 7, 2023

(54) HYPOTHESIS STITCHER FOR SPEECH RECOGNITION OF LONG-FORM AUDIO

(71) Applicant: Microsoft Technology Licensing, LLC, Redmond, WA (US)

(72) Inventors: Naoyuki Kanda, Bellevue, WA (US); Xuankai Chang, Baltimore, MD (US); Yashesh Gaur, Redmond, WA (US); Xiaofei Wang, Bellevue, WA (US); Zhong Meng, Mercer Island, WA (US); Takuya Yoshioka, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 17/127,938

(22) Filed: Dec. 18, 2020

(65) Prior Publication Data
US 2022/0199091 A1  Jun. 23, 2022

(51) Int. Cl.
*G10L 15/00* (2013.01)
*G10L 17/02* (2013.01)
(Continued)

(52) U.S. Cl.
CPC .............. *G10L 17/02* (2013.01); *G10L 15/22* (2013.01); *G10L 15/26* (2013.01); *G10L 19/022* (2013.01); *G10L 21/0272* (2013.01)

(58) Field of Classification Search
CPC ....... G10L 15/26; G10L 19/022; G10L 15/16; G10L 21/0272; G10L 15/04; G10L 17/00;
(Continued)

(56) References Cited

U.S. PATENT DOCUMENTS

2011/0304369 A1* 12/2011 Hu .................. H03L 7/0814
327/161

FOREIGN PATENT DOCUMENTS

WO  WO-2016167779 A1 * 10/2016  ............. G10L 15/16
WO     2020206455 A1    10/2020

OTHER PUBLICATIONS

Carletta, et al., "The AMI meeting corpus: A pre-announcement", In International workshop on machine learning for multimodal interaction, Jul. 11, 2005, 13 Pages.
(Continued)

*Primary Examiner* — Md S Elahee

(57) ABSTRACT

A hypothesis stitcher for speech recognition of long-form audio provides superior performance, such as higher accuracy and reduced computational cost. An example disclosed operation includes: segmenting the audio stream into a plurality of audio segments; identifying a plurality of speakers within each of the plurality of audio segments; performing automatic speech recognition (ASR) on each of the plurality of audio segments to generate a plurality of short-segment hypotheses; merging at least a portion of the short-segment hypotheses into a first merged hypothesis set; inserting stitching symbols into the first merged hypothesis set, the stitching symbols including a window change (WC) symbol; and consolidating, with a network-based hypothesis stitcher, the first merged hypothesis set into a first consolidated hypothesis. Multiple variations are disclosed, including alignment-based stitchers and serialized stitchers, which may operate as speaker-specific stitchers or multi-speaker stitchers, and may further support multiple options for differing hypothesis configurations.

20 Claims, 11 Drawing Sheets

(51) Int. Cl.
*G10L 15/22* (2006.01)
*G10L 15/26* (2006.01)
*G10L 19/022* (2013.01)
*G10L 21/0272* (2013.01)

(58) Field of Classification Search
CPC ......... G10L 17/02; G10L 15/22; G10L 15/32; G10L 15/01; H04L 1/0046; H03L 7/0814
USPC ........................................................ 704/251
See application file for complete search history.

(56) References Cited

OTHER PUBLICATIONS

Chang, et al., "Hypothesis Stitcher for End-to-End Speaker-attributed ASR on Long-form Multi-talker Recordings", In Repository of arXiv:2101.01853v1, Jan. 6, 2021, 5 Pages.

Chen, et al., "Continuous speech separation: Dataset and analysis", In IEEE International Conference on Acoustics, Speech and Signal Processing, May 7, 2020, 6 Pages.

Chiu, et al., "A comparison of end-to-end models for long-form speech recognition,", In IEEE Automatic Speech Recognition and Understanding Workshop, Dec. 14, 2019, pp. 889-896.

Chiu, et al., "RNN-T Models Fail to Generalize to Out-of-Domain Audio: Causes and Solutions", In Repository of arXiv:2005.03271 v2, May 17, 2020, 5 Pages.

Chorowski, et al., "Attention-Based Models for Speech Recognition", In Proceedings of Advances in Neural Information Processing Systems, Dec. 7, 2015, 9 Pages.

Fiscus, et al., "The Rich Transcription 2007 Meeting Recognition Evaluation", In Publication of Springer as Multimodal Technologies for Perception of Humans, Jan. 1, 2008, 18 Pages.

Janin, et al., "The ICSI Meeting Corpus", In Proceedings IEEE International Conference on Acoustics, Speech, and Signal Processing, vol. 1, Apr. 6, 2003, pp. 364-367.

Kanda, et al., "Guided source separation meets a strong ASR backend: Hitachi/ Paderborn University joint investigation for dinner party ASR", In 20th Annual Conference of the International Speech Communication Association, Sep. 15, 2019, 5 Pages.

Kanda, et al., "Investigation of end-to-end speaker-attributed asr for continuous multi-talker recordings", In Repository of arXiv:2008.04546v1, Aug. 11, 2020, 8 Pages.

Kanda, et al., "Joint Speaker Counting, Speech Recognition, and Speaker Identification for Overlapped Speech of Any Number of Speakers", In Proceedings of 21st Annual Conference of the International Speech Communication Association, Oct. 25, 2020, pp. 36-40.

Kanda, et al., "Serialized output training for end-to-end overlapped speech recognition", In Proceedings of 21st Annual Conference of the International Speech Communication Association, Oct. 25, 2020, 5 Pages.

Kanda, et al., "Simultaneous speech recognition and speaker diarization for monaural dialogue recordings with targetspeaker acoustic models", In Proceedings of IEEE Automatic Speech Recognition and Understanding Workshop, Dec. 14, 2019, 8 Pages.

Mao, et al., "Speech recognition and multi-speaker diarization of long conversations", In Repository of arXiv:2005.08072v2, Nov. 5, 2020, 5 Pages.

Narayanan, et al., "Recognizing long-form speech using streaming end-to-end models", In Proceedings of IEEE Automatic Speech Recognition and Understanding Workshop, Dec. 14, 2019, 8 Pages.

Panayotov, et al., "Librispeech: an Asr Corpus Based on Public Domain Audio Books", In Proceedings of IEEE International Conference on Acoustics, Speech and Signal Processing, Apr. 19, 2015, pp. 5206-5210.

"International Search Report and Written Opinion Issued in PCT Application No. PCT/US21/060423", dated Mar. 14, 2022, 11 Pages.

Shafey, et al., "Joint speech recognition and speaker diarization via sequence transduction", In Proceedings of 20th Annual Conference of the International Speech Communication Association, Sep. 15, 2019, pp. 396-400.

Watanabe, et al., "CHiME-6 Challenge: Tackling Multispeaker Speech Recognition for Unsegmented Recordings", In Proceedings of 6th International Workshop on Speech Processing in Everyday Environments, May 2, 2020, 7 Pages.

Yoshioka, et al., "Advances in Online Audio-Visual Meeting Transcription", In Proceedings of IEEE Automatic Speech Recognition and Understanding Workshop, Dec. 14, 2019, pp. 276-283.

* cited by examiner

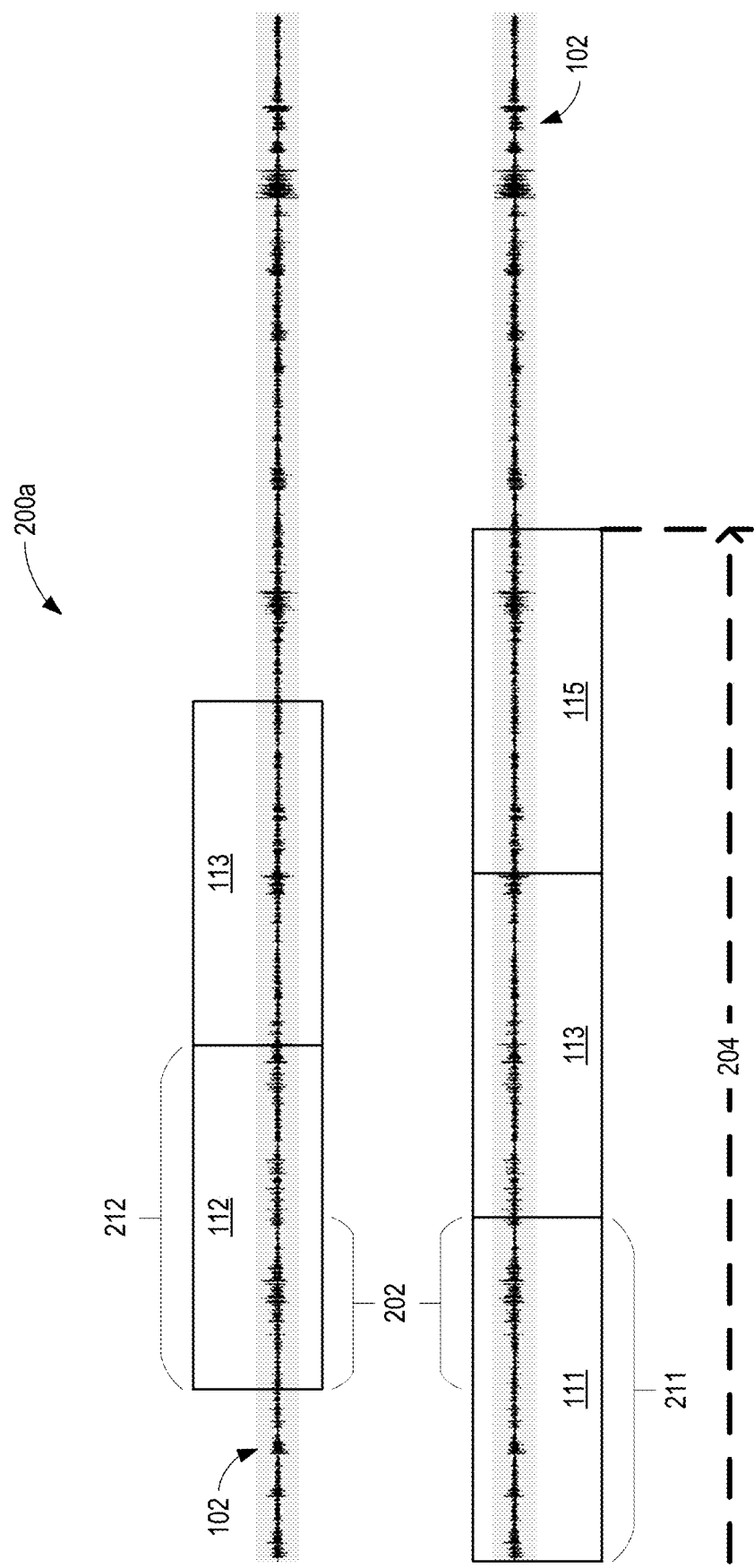

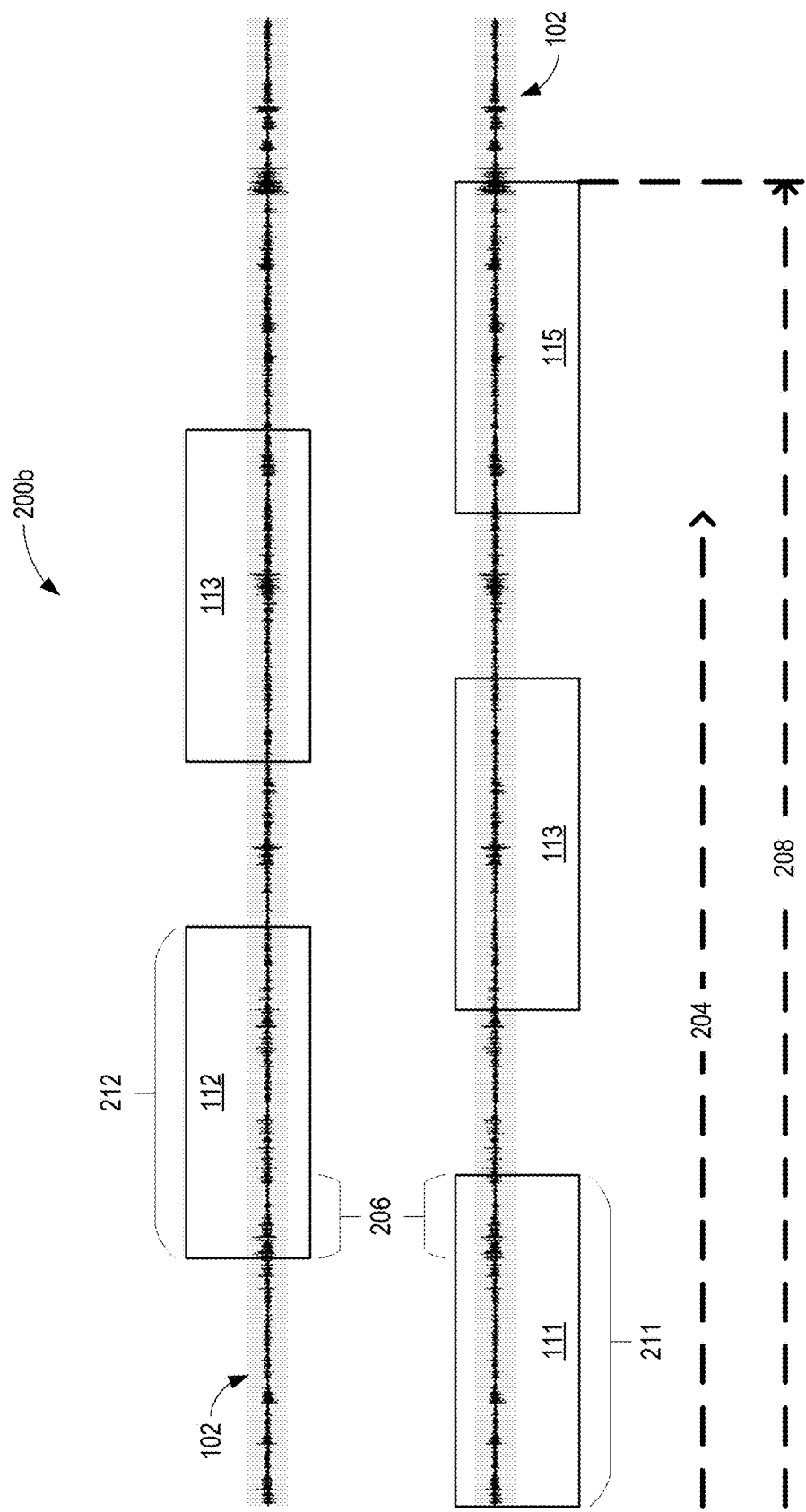

FIG. 6A

602 → W1 W2 W3 W4 <S1> W5 W6 W7 <S2> W8 W9 W10 <S1> <WCO> W11 W12 <S2> W13 W14 W15 <S3> <WCE> ...

604 → W1 W2 W3 W4 <S5> W5 W6 W7 <S1> W8 W9 W10 <S5> <WCO> W11 W12 <S1> W13 W14 W15 <S4> <WCE> ...

612 → W1 W2 W3 W4 W5 W6 W7 W8 W9 W10 <WCO> W11 W12 W13 W14 W15 <WCE> ...
S1 S1 S1 S1 S2 S2 S2 S2 S2 S2 S0 S0 S2 S3 S3 S3 S0 ...

622 ↗
W1 W2 W3 W4 W5 W6 W7 W8 W9 W10 <WCO> W11 W12 W13 W14 W15 <WCE> ...
S1 S1 S1 L1 S2 S2 S2 S1 S1 S1   S0        S2 S2 S3 S3 S3 S0   ...
L1 L1 L1   L2 L2 L2 L1 L1 L1   L0        L2 L2 L1 L1 L1 L0   ...

624 ↗
W1' W2' W3' W4' W5' W6' W7' W8' W9' W10' W11' W12' W13' W14' W15' ...
S1 S1 S1 L1 S2 S2 S2 S1 S1 S1 S1 S2 S2 S3 S3 S3 ...
L1 L1 L1    L2 L2 L2 L1 L1 L1 L1 L2 L2 L1 L1 L1 ...

626 ↗
W1' W2' W3' W4' <S1><L1> W5' W6' W7' <S2><L2> W8' W9' W10' <S1><L1> W11' W12' <S2><L2> W13' W14' W15' <S3><L1> ...

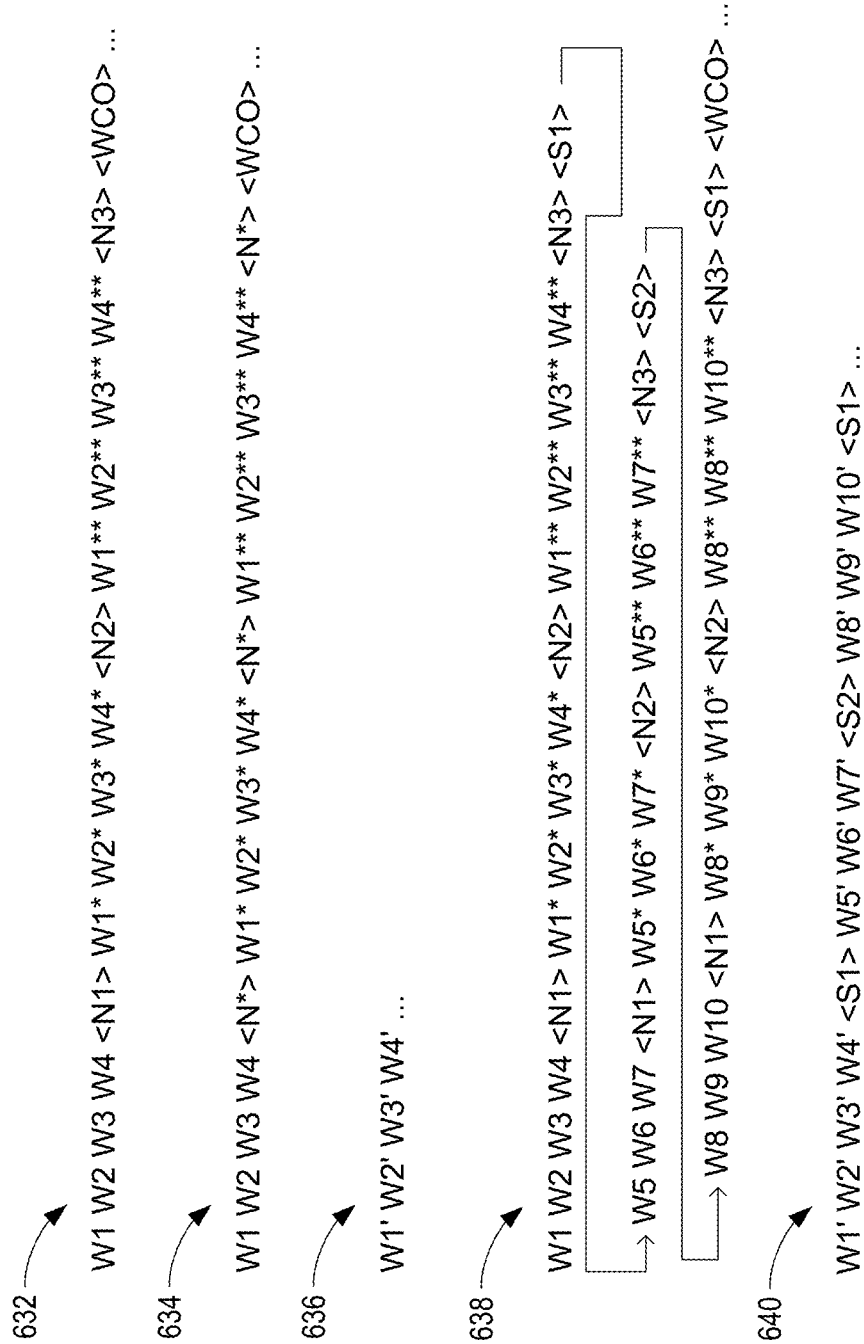

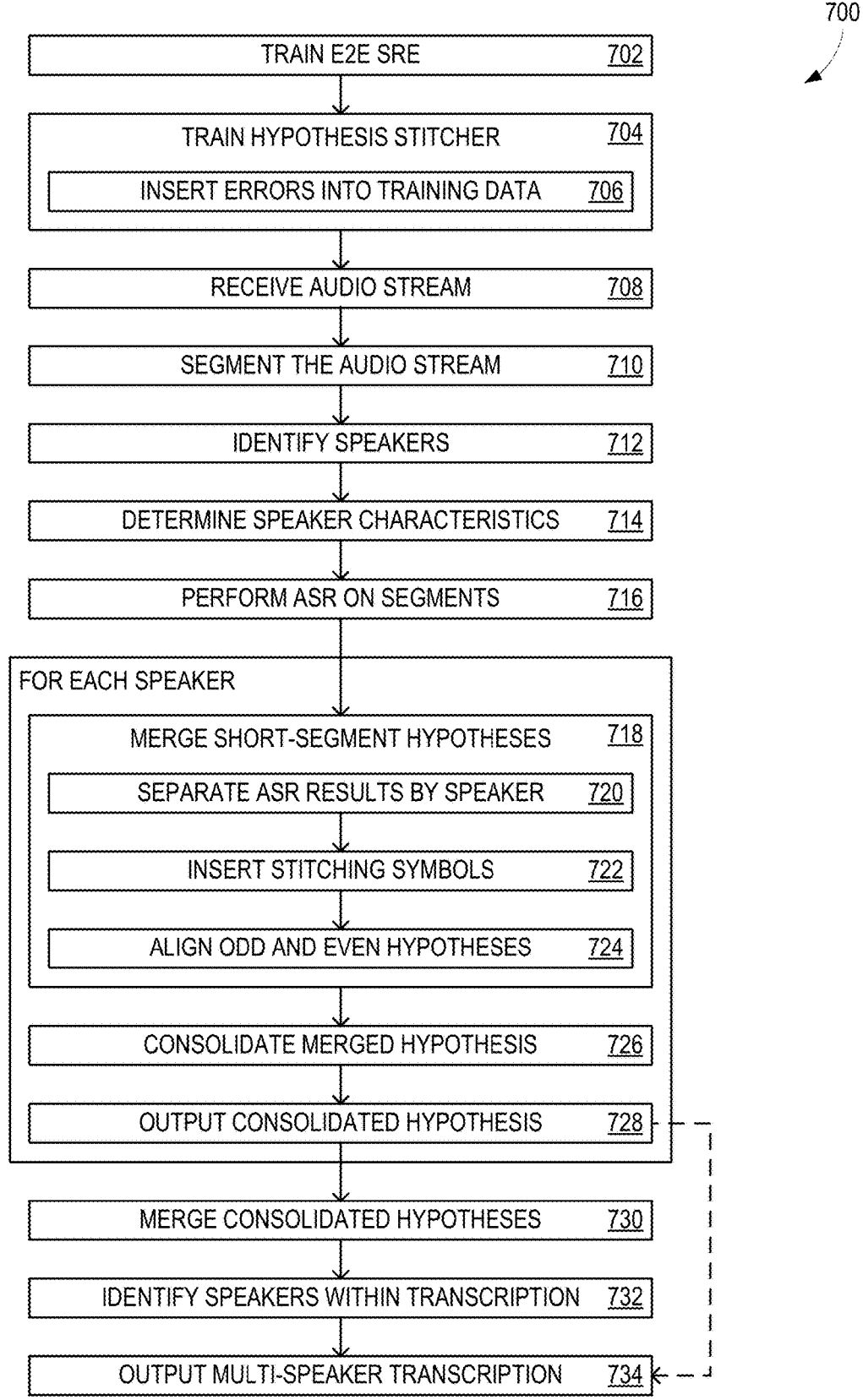

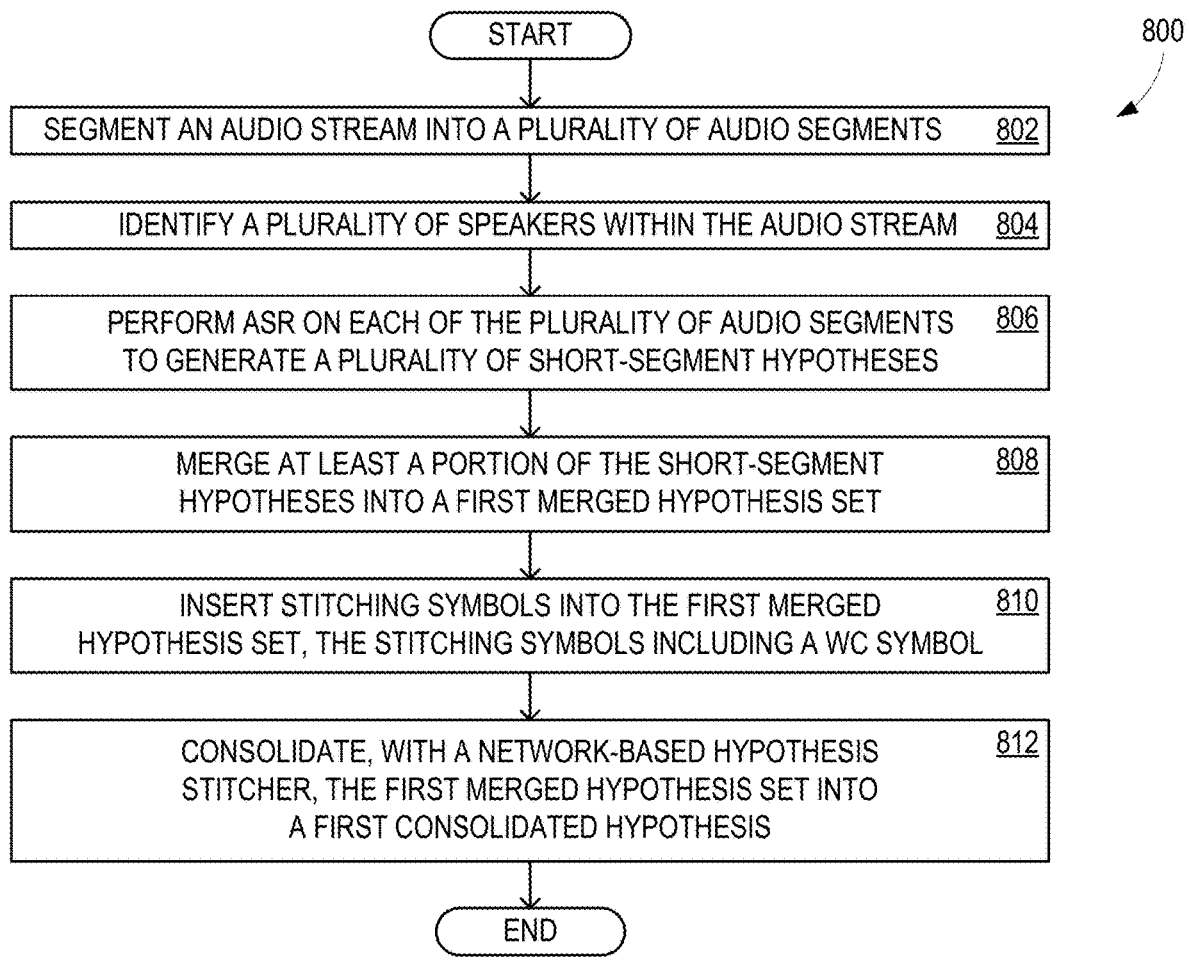

HYPOTHESIS STITCHER FOR SPEECH RECOGNITION OF LONG-FORM AUDIO

BACKGROUND

End-to-end (E2E) automatic speech recognition (ASR) systems use a single neural network (NN) to transduce audio to word sequences, and are thus typically simpler than earlier ASR systems. E2E ASR solutions typically intake short audio segments to process a full utterance prior to producing a hypothesis. Unfortunately, models trained on short utterances generally underperform when applied to speech that exceeds the training data length. Such scenarios may occur with long-form speech (e.g., speech lasting 10 minutes or more), which may be encountered when transcribing streaming audio and in other ASR tasks.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

A hypothesis stitcher for speech recognition of long-form audio provides superior performance, such as higher accuracy and reduced computational cost. An example disclosed operation includes: segmenting the audio stream into a plurality of audio segments; identifying a plurality of speakers within each of the plurality of audio segments; performing automatic speech recognition (ASR) on each of the plurality of audio segments to generate a plurality of short-segment hypotheses; merging at least a portion of the short-segment hypotheses into a first merged hypothesis set; inserting stitching symbols into the first merged hypothesis set, the stitching symbols including a window change (WC) symbol; and consolidating, with a network-based hypothesis stitcher, the first merged hypothesis set into a first consolidated hypothesis. Multiple variations are disclosed, including alignment-based stitchers and serialized stitchers, which may operate as speaker-specific stitchers or multi-speaker stitchers, and may further support multiple options for differing hypothesis configurations.

BRIEF DESCRIPTION OF THE DRAWINGS

The disclosed examples are described in detail below with reference to the accompanying drawing figures listed below:

FIGS. 2A and 2B illustrates examples of window overlap, as may be used with the arrangement of FIG. 1;

FIGS. 6A, 6B, 6C, and 6D illustrate examples of merged hypothesis sets for multi-speaker serialized stitcher variations, as may be used in the arrangement of FIG. 1;

FIG. 7 is a flowchart illustrating exemplary operations associated with the arrangement of FIG. 1;

FIG. 8 is another flowchart illustrating exemplary operations associated with the arrangement of FIG. 1.

Corresponding reference characters indicate corresponding parts throughout the drawings.

DETAILED DESCRIPTION

Figure 1:
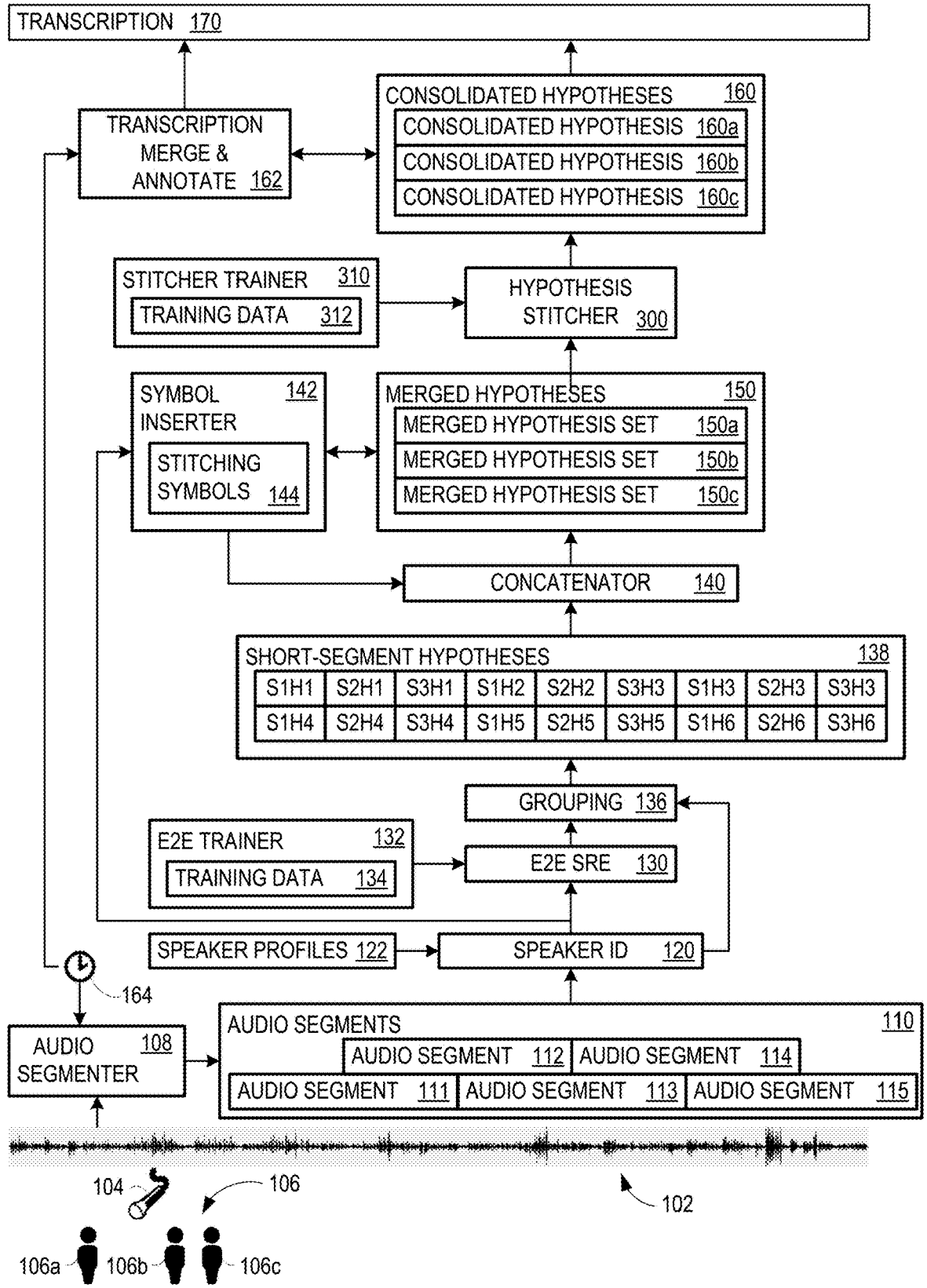
FIG. 1 illustrates an arrangement for speech recognition that advantageously employs a hypothesis stitcher for speech recognition of long-form audio.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

A hypothesis stitcher for speech recognition of long-form audio provides superior performance, such as higher accuracy and reduced computational cost. An example disclosed operation includes: segmenting the audio stream into a plurality of audio segments; identifying a plurality of speakers within each of the plurality of audio segments; performing automatic speech recognition (ASR) on each of the plurality of audio segments to generate a plurality of short-segment hypotheses; merging at least a portion of the short-segment hypotheses into a first merged hypothesis set; inserting stitching symbols into the first merged hypothesis set, the stitching symbols including a window change (WC) symbol; and consolidating, with a network-based hypothesis stitcher, the first merged hypothesis set into a first consolidated hypothesis. Multiple variations are disclosed, including alignment-based stitchers and serialized stitchers, which may operate as speaker-specific stitchers or multi-speaker stitchers, and may further support multiple options for differing hypothesis configurations.

Aspects of the disclosure improve the speed and accuracy of speech recognition by merging short-segment hypotheses into a merged hypothesis set and consolidating, with a network-based hypothesis stitcher, a merged hypothesis set into a consolidated hypothesis. The network-based hypothesis stitcher provides superior accuracy. Some examples employ a serialized stitcher that does not require alignment of odd and even hypothesis sequences (e.g., word alignment), reducing the required degree of overlap, and thus cutting computational cost.

The hypothesis stitcher intakes multiple hypotheses from short-segmented audio and outputs a fused single hypothesis, significantly improving speaker-attributed word error rate (SA-WER) for long-form multi-speaker audio. As used herein, a hypothesis is an estimated content of audio, and may include a sequence of estimated words or tokens representing words. A hypothesis may further contain other estimated content such as speaker identification, language identification, and other speaker characterizations, along with other tags or symbols. Multiple variants of model architectures are disclosed, including some that have reduced computational cost, due to the relaxation of overlap requirements.

Examples segment long audio using sliding window with overlaps among the segments, end-to-end (E2E) ASR is applied to each window to generate hypotheses. The hypotheses from each window are fused into a single hypothesis using a sequence-to-sequence model that has been trained to fuse multiple hypotheses from overlapping windows. By using a machine learning (ML) module, the hypotheses fusion can be executed with a significantly high accuracy.

FIG. 1 illustrates an arrangement 100 for speech recognition that advantageously employs a hypothesis stitcher for speech recognition of long-form audio. An audio stream 102 is received (captured) by a microphone 104 from a plurality of speakers 106 that includes a speaker 106a, a speaker 106b, and a speaker 106c. Audio stream 102 is received and segmented by audio segmenter 108 into a plurality of audio segments 110. As shown, plurality of audio segments 110 includes an audio segment 111, an audio segment 112, an audio segment 113, an audio segment 114, and an audio segment 115, although it should be understood that a different number of audio segments may be used.

Turning briefly to FIGS. 2A and 2B, overlap of audio segments will be described. FIG. 2A illustrates 50% window overlap in overlap scenario 200a, in which each of the odd-numbered audio segments stop and start back-to-back (e.g., without gaps), and the even-numbered audio segments similarly stop and start back-to-back (e.g., without gaps). The changes between odd-numbered windows occur within the even-numbered windows, and the changes between even-numbered windows similarly occur within the odd-numbered windows, producing parallel, staggered sequences. Audio stream 102 is shown twice, once annotated with odd-numbered audio segments (e.g., audio segments 111, 113, and 115) and also annotated with even-numbered audio segments (e.g., audio segments 112 and 112). Window length 211 for audio segment 111 is consistent for other audio segments 112-115, for example, matching the window length 212 for audio segment 112. An overlap duration 202 is half (50%) of each window length 211 and window length 212. Together, the five audio segments 111-115 cover a time period 204. In some examples, window length 211 is 16 seconds, or 30 seconds, or some other time period having a duration of less than a minute, whereas the length of audio stream may be in excess of 10 minutes or even in excess of an hour.

FIG. 2B illustrates 25% window overlap in overlap scenario 200b. The changes between odd-numbered windows occur within the even-numbered windows, and the changes between even-numbered windows similarly occur within the odd-numbered windows, producing parallel, staggered sequences—but allowing for gaps within each of the odd and even sequences. Audio stream 102 is shown twice, once annotated with odd-numbered audio segments (e.g., audio segments 111, 113, and 115) and also annotated with even-numbered audio segments (e.g., audio segments 112 and 112). Window length 211 for audio segment 111 is consistent for other audio segments 112-115, for example, matching the window length 212 for audio segment 112. An overlap duration 206 is one-fourth (25%) of each window length 211 and window length 212. Together, the five audio segments 111-115 cover a time period 208, which is longer than time period 204 for overlap scenario 200a (having 50% window overlap).

Thus, for the same length of time as time period 204, fewer audio segments are processed for 25% overlap than for 50% overlay, reducing computational cost. The overlap of hypotheses follows the overlap of audio segments. It should be understood that aspects of the disclosure may use differing amounts of overlap, including overlap as low as 10% or lower.

Returning to FIG. 1, plurality of audio segments 110 is provided to speaker identification 120, which uses speaker profiles 122 (e.g., information regarding speaker characteristics of speakers 106a-106c) to associate each of speakers 106a-106c with utterances within plurality of audio segments 110. Plurality of audio segments 110 is also provided to E2E speech recognition engine (SRE) 130 to perform speech recognition and output hypotheses. In some examples, a different form of SRE, rather than E2E, may be employed. E2E SRE 130 is trained by E2E trainer 132, which uses speech recognition training data 134. Hypotheses output by E2E SRE 130 are grouped according to speaker, by speaker grouping 136, into speaker-specific short-segment hypotheses 138. ASR is performed on each of audio segments 111-115 to produce $\{\hat{Y}^{m,1}, \ldots \hat{Y}^{m,K}\}$, where K is the number of speakers 106a-106c (and is also the number of profiles within speaker profiles 122 for this example).

Short-segment hypotheses 138 is illustrated with an example set of fifteen hypotheses, six for each of speakers 106a-106c. S1H1, S1H2, S1H3, S1H4, S1H5, and S1H6 are six hypotheses for speaker 106a, in order of occurrence. S2H1, S2H2, S2H3, S2H4, S2H5, and S2H6 are six hypotheses for speaker 106b, in order of occurrence. S3H1, S3H2, S3H3, S3H4, S3H5, and S3H6 are six hypotheses for speaker 106c, in order of occurrence. It should be understood that three speakers with six utterances each (producing the six hypotheses each) is only an example.

A concatenator 140 merges at least a portion of (e.g., at least some of) short-segment hypotheses 138 into merged hypotheses 150, which includes at least merged hypothesis set 150a. In general, the hypotheses of short-segment hypotheses 138 may be merged into sets and take on the form shown in Equation 1:

$$\hat{Y}^k = \{\hat{Y}^{1,k}, \ldots \hat{Y}^{M,k}\} \quad Eq. \quad (1)$$

where $\hat{Y}^{m,k}$ represents the hypothesis for speaker k in audio segment m, k ranges from 1 to the number of speakers K, and m ranges from 1 to the number of audio segments M. For example, audio stream 102 is segmented into M segments (with overlaps). $\hat{Y}^k$ is the merged hypothesis set (e.g., merged hypothesis set 150a) for speaker k. In some examples, if a speaker k is not detected in an audio segment m, the hypothesis $\hat{Y}^{m,k}$ is set to an empty sequence.

Multiple options are disclosed in the following figures for the operation of concatenator 140 and the format of merged hypotheses 150. Variations include whether merged hypotheses 150 includes speaker-specific merged hypothesis sets (e.g., each of merged hypothesis set 150a, merged hypothesis set 150b, and merged hypothesis set 150a is for only a single one if speakers 106a-106c) or whether merged hypotheses 150 includes a multi-speaker version of merged hypothesis set 150a.

A symbol inserter 142 inserts stitching symbols 144 into merged hypotheses 150, for example, into merged hypothesis set 150a and also merged hypothesis sets 150b and 150c, if they are used. Stitching symbols 144 include a generic window change (WC) symbol 144a, and in some examples, include an even window change (WCE) symbol 144b (indicating a change from an odd-numbered window to an even-numbered window) and an odd window change (WCO) symbol 144c (changing from an even-numbered window to an odd-numbered window). Window changes correspond to the end of a word or token sequence recognized from one audio segment to the start of a word or token sequence recognized from the next audio segment. In some examples, stitching symbols 144 may further include: a speaker identification (SPKR_k, where k is an index number for the speaker), speaker characteristics (e.g., language (LANG_k), speaker age (AGE_k), and accent (AC- CENT_k)), and hypotheses ranks. Multiple options are disclosed for using stitching symbols 144, as shown in FIGS. 4-6D.

A hypothesis stitcher 300 consolidates merged hypotheses 150 into consolidated hypotheses 160. In some examples, this may be accomplished by merging speaker-specific merged hypothesis sets 150*a*-150*c* into speaker-specific consolidated hypotheses (e.g., consolidated hypothesis 160*a*, consolidated hypothesis 160*b*, and consolidated hypothesis 160*c*), whereas in some other examples, merged hypothesis set 150*a* is a multi-speaker merged hypothesis set that is merged into a multi-speaker version of consolidated hypothesis 160*a*. Hypothesis stitcher 300 may be network-based, and in some examples may comprise a neural network (NN). Various configurations are disclosed, for example, an alignment-based stitcher and a serialized stitcher that does not use an alignment of odd and even hypothesis sequences, and thus may have a relaxed overlap requirement. Further detail regarding hypothesis stitcher 300, a stitcher trainer 310, and hypothesis stitcher training data 312 is provided in relation to FIG. 3.

Consolidated hypothesis 160*a* is output as a transcription 170, which may be used for various tasks for which ASR results are useful, including live transcription of a conversation (e.g., a video call or speech) or streaming video, and voice commands. In some examples, consolidated hypothesis 160*a* is a multi-speaker consolidated hypothesis, and includes the multiple speakers (e.g., speakers 106*a*-106*c*). In some examples, each of consolidated hypothesis 160*a*-160*c* is a speaker-specific consolidated hypothesis and transcription 170 will then be a speaker-specific transcription, unless consolidated hypothesis 160*a*-160*c* are merged into a multi-speaker version of transcription 170 by a transcription merger and annotator 162. In some examples, transcription merger and annotator 162 intakes each of consolidated hypothesis 160*a*-160 and outputs a multi-speaker version of transcription 170. In some examples, transcription merger and annotator 162 annotates transcription 170 with timestamps, obtained by a timer 164, which may be used for defining time windows used by audio segmenter 108 (so that the timestamps are properly synchronized with audio stream 102).

Figure 3:
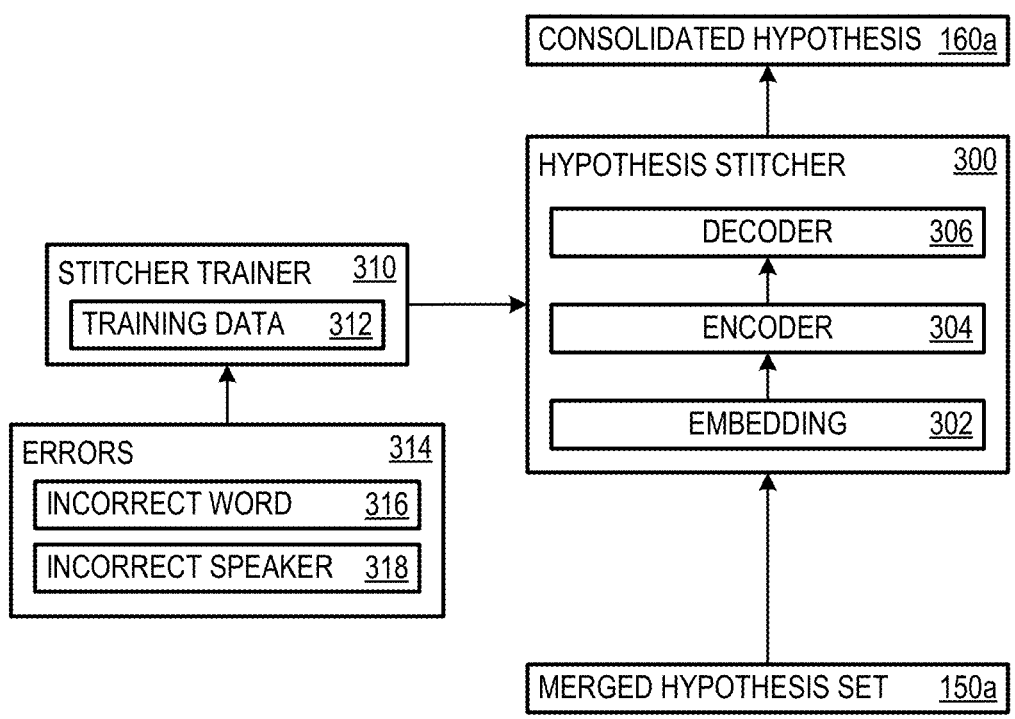
FIG. 3 illustrates further details for examples of the hypothesis stitcher of FIG. 1.

FIG. 3 illustrates further details for hypothesis stitcher 300. Hypothesis stitcher 300 comprises an encoder 304, a decoder 306, and an embedding function 302. Embedding function 302 intakes a symbol (e.g., a word, a token, or a stitching symbol) and outputs a vector (called an embedding) corresponding to the symbol. In some examples, hypothesis stitcher 300 comprises a transformer-based attention encoder decoder architecture. In some examples, hypothesis stitcher 300 comprises a sequence-to-sequence model (e.g., a trained NN) that merges multiple hypotheses from short-segmented audio into a single hypothesis. In some examples, hypothesis stitcher 300 is trained using conversations that have been segmented according to the overlap that will be used during operations, tagged with stitching symbols 144 (so that hypothesis stitcher 300 learns stitching symbols 144), and labeled for training. That is, hypothesis stitcher training data 312 includes stitching symbols 144 and has overlaps similar to overlaps in merged hypothesis set 150*a*.

In some examples, errors 314 are inserted into hypothesis stitcher training data 312 so that hypothesis stitcher 300 learns to correct errors, such as incorrect word 316 (e.g., mistakenly-recognized words in hypotheses) and incorrect speaker 318 (e.g., a mis-identified speaker). Variations such as an alignment-based stitcher and serialized stitcher are described in further detail in relation to FIGS. 4 and 5.

Figure 4:
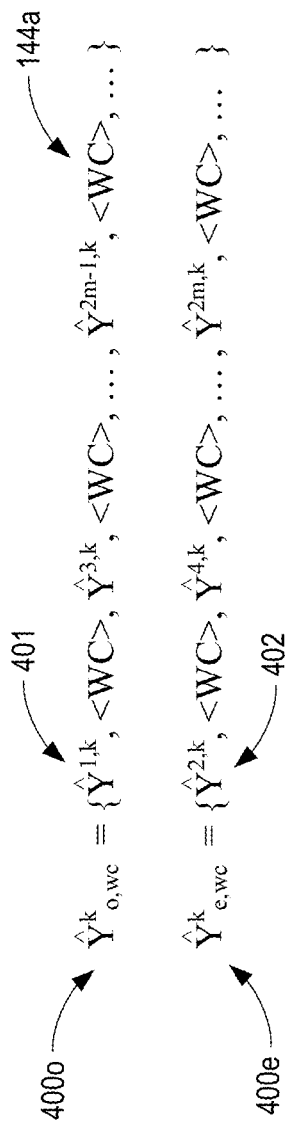
FIG. 4 illustrates example hypothesis sets for an alignment-based stitcher, as may be used in the arrangement of FIG. 1.

FIG. 4 illustrates example hypothesis sequences, sequence 400*o* (o for "odd") and sequence 400*e* (e for "even"), which are combined into hypothesis set 150*a* for an alignment-based stitcher version of hypothesis stitcher 300. In the scenario depicted, 50% overlap is used, in which the odd-numbered audio segments stop and start, and overlap with the even-numbered audio segments as indicated in FIG. 2A. The hypotheses from odd-numbered (e.g., 401) and even-numbered (e.g., 402) hypotheses sets are jointed into two sequences 400*o* and 400*e*, as indicated in FIG. 4.

Sequence 400*o* ($\hat{Y}_{o,wc}^{k}$) has an odd numbered (1 is odd) hypothesis 401, and other odd numbered hypotheses, for speaker k. Sequence 400*e* ($\hat{Y}_{e,wc}^{k}$) has an even numbered (2 is even) hypothesis 40, and other even numbered hypotheses, also for speaker k. WC symbol 144*a* is inserted between the hypotheses to indicate a change of windows corresponding to changing from one audio segment to the next. Sequences 400*o* and 400*e* are word-aligned as a sequence of word pairs <$o_1$, $e_1$>, <$o_2$, $e_2$>, . . . <$o_L$, $e_L$> for L pairs, where WC may be $o_l$ or $e_l$ for some pair l. Sequences 400*o* and 400*e* are then fused into merged hypothesis set 150*a* (or another merged hypothesis set) for consolidation by hypothesis stitcher 300.

Figure 5:
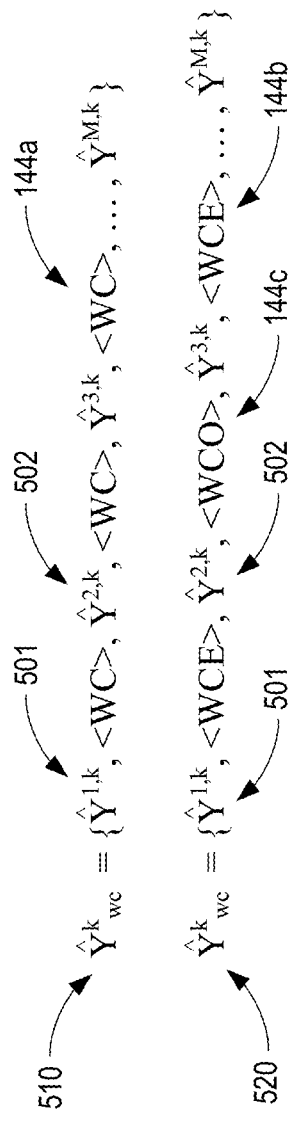
FIG. 5 illustrates examples of merged hypothesis sets for a serialized stitcher, as may be used in the arrangement of FIG. 1.

FIG. 5 illustrates two examples of hypothesis set 150*a* for a serialized stitcher version of hypothesis stitcher 300 are shown alternatively as hypothesis set 510 or hypothesis set 520. In this scenario, overlap may be less than 50% because word alignment is not used. In some examples, the hypotheses for speaker k are joined as shown for hypothesis set 510, which has both odd and even numbered hypotheses, for example odd-numbered hypothesis 501 ($\hat{Y}^{1,k}$), even-numbered hypothesis 502 ($\hat{Y}^{2,k}$), and WC symbol 144*a* inserted between hypotheses. Hypothesis set 520 is similar, although using WC symbols designated as even and odd, for example WCE symbol 144*b* and WCO symbol 144*c*. Hypothesis set 510 or 520 is provided as merged hypothesis set 150*a* (or another merged hypothesis set) for consolidation by hypothesis stitcher 300.

FIGS. 6A-6D illustrate multi-speaker data sets, in which all speakers' hypotheses are concatenated into a single sequence, and using a SPKR symbol as one of stitching symbols 144. In some examples, the SPRK symbol indicates a speaker number k, as SPKR_k. To enable the relatively long sequences to be easily shown in FIGS. 6A-6D, sequences uses W1, W2, . . . to indicate hypotheses for words in merged hypotheses 150 (e.g., ($\hat{Y}^{m,k}$) and SPKR_k is abbreviated as S1, S2, S3, S4, and S5, for k=1, 2, 3, 4, 5, respectively. That is, S1 is the abbreviated SPKR_k symbol for the first speaker (k=1).

Two variations for ordering SPKR symbols are shown in FIG. 6A. Sequence 602 is ordered according to the order of a speaker's first-time appearance in audio stream 102 (and transcription 170). Sequence 604 shows another possible variation, ordered according to the order of a speaker's profile in speaker profiles 122. It should be noted that, because of overlap in the windows (e.g., audio segments 111-115) some of the hypotheses in subsequent windows (e.g., words preceding a WC, WCE, or WCO symbol) correspond. That is, W11 and W12 may correspond to W9 and W10, for example. The output of hypothesis stitcher 300 is shown as sequence 606, in which W1', W2', . . . indicate the words selected by hypothesis stitcher 300 for consolidated hypothesis 160*a* (or another consolidated hypothesis). In some examples, speaker symbols are assigned for along with other stitching symbols (e.g., <WCO> and <WCE>), and may take the form of a special identification, such as <Sn>, where n indicated the speaker number (according to an index in speaker profiles 122).

FIG. 6B shows variations for using SPKR symbols in the output of hypothesis stitcher 300 (e.g., consolidated hypothesis 160a, or another consolidated hypothesis) as stitching symbols. Sequence 612 shows the same sequence of words (or tokens) as sequence 602 of FIG. 6A, but with each word annotated. A special SPKR symbol <S0> may be assigned to each stitching symbol. The output of hypothesis stitcher 300 may alternatively be in the format of sequence 614, in which each word (or token) is annotated with a SPKR symbol, or in the format of sequence 616, in which the SPKR symbol is used at the end of a sequence of words attributed to a particular speaker (when the following word is attributed to a different speaker. In the illustrated example, sequences 606 and 616 are similar.

FIG. 6C shows variations for using LANG symbols in the output of hypothesis stitcher 300 (e.g., consolidated hypothesis 160a, or another consolidated hypothesis) as stitching symbols. Sequence 622 is similar to sequence 612 of FIG. 6B, but adds a language annotation after each word. The output of hypothesis stitcher 300 may alternatively be in the format of sequence 624, in which each word (or token) is annotated with a LANG symbol, or in the format of sequence 626, in which the LANG symbol is used at the end of a sequence of words attributed to a particular speaker or a change in the detected language. In the format of sequence 622, a special LANG symbol <L0> may be assigned to each stitching symbol. Other speaker attributes (speaker age, accent, and others) may also be embedded. When age annotation is included with stitching symbols, the annotation may take the form of a symbol that incorporates the actual numerical value estimated for a speaker.

FIG. 6D shows the use of multiple ranked hypotheses, for example the N-best hypotheses, as estimated by E2E SRE 130. In some examples, E2E SRE 130 is able to output more than a single hypothesis per detected word, and outputs multiple ranked hypotheses (ranked by probability of being correct). Sequence 632 shows a single speaker scenario in which a set of four words is identified as a best guess (N1) as W1, W2, W3, and W4, a second best guess (N2) as W1*, W2*, W3*, and W4*, and a third best guess (N3) as W1, W2, W3, and W4. An alternative sequence 634 shows the use of a best guess symbol N* in place of specific guess rank values, in which rank is inferred by the order. N1, N2, N3, and/or N* are used as stitching symbols in the input to hypothesis stitcher 300. The output of hypothesis stitcher 300 is shown as sequence 636, with selected words W1', W2', W3', and W4'. A multi-speaker version uses sequence 638, in which the speaker is annotated after each set of N-best guesses. The output of hypothesis stitcher 300 is shown as sequence 640 with selected words W1', W2', W3', W4', W5', W6', W7', W8', W9', and W10'.

FIG. 7 is a flowchart 700 illustrating exemplary operations involved in performing speech recognition. In some examples, operations described for flowchart 700 are performed by computing device 900 of FIG. 9. Flowchart 700 commences with operation 702, which includes training E2E SRE 130. In some examples, a joint model SRE (e.g., an end-to-end speaker-attributed ASR model) and speaker identification is trained in operation 702, and operations 712, 714, 716 below use this joint model. Operation 704 includes training hypothesis stitcher 300 with hypothesis stitcher training data 312 comprising stitching symbols. In some examples, hypothesis stitcher training data 312 has overlaps similar to overlaps in merged hypothesis set 150a. Operation 706, which is included in operation 704, includes inserting errors 314 into hypothesis stitcher training data 312. In some examples, inserted errors 314 include an incorrectly identified word (in an overlapped region of a segment) or an incorrect speaker identification. In some examples, hypothesis stitcher 300 comprises an encoder and a decoder. In some examples, hypothesis stitcher 300 comprises a neural network. In some examples, hypothesis stitcher 300 comprises a transformer-based attention encoder decoder architecture. In some examples, hypothesis stitcher 300 comprises an alignment-based stitcher. In some examples, hypothesis stitcher 300 comprises a serialized stitcher that does not use an alignment of odd and even hypothesis sequences. In some examples, hypothesis stitcher 300 uses 25% overlap or less Operation 708 includes receiving audio stream 102. Operation 710 includes segmenting audio stream 102 into plurality of audio segments 110. In some examples, each of the audio segments have a duration of less than a minute. Operation 712 includes identifying plurality of speakers 106 (e.g., identifying each of speakers 106a-106c) within each of the plurality of audio segments 110 (e.g., within audio stream 102). Operation 714 includes determining speaker characteristics. In some examples, the speaker characteristics are selected from a list consisting of: language, speaker age, and accent. Operation 716 includes performing ASR on each of plurality of audio segments 110 (e.g., audio segments 111-115) to generate plurality of short-segment hypotheses 138. In some examples, performing ASR comprises performing E2E ASR. In some example, operations 712-716 are performed as a single operation, using a common joint model (e.g., the end-to-end speaker-attributed ASR model described above). In some examples, short-segment hypotheses 138 comprise tokens representing words.

In some examples, short-segment hypotheses 138 are specific to a speaker, and so following operations 718-728 are performed for each speaker, using speaker-specific data sets (e.g., short-segment hypotheses 138, merged hypotheses 156, and consolidated hypotheses 160). In some examples, short-segment hypotheses 138 are for multiple speakers, and so following operations 718-728 are performed using multi-speaker data sets (e.g., multi-speaker versions of short-segment hypothesis 138, merged hypothesis set 156a, and consolidated hypothesis 160a).

Operation 718 includes merging at least a portion of short-segment hypotheses 138 into merged hypothesis set 150a, and is performed using operations 720-724. In some examples, merging at least a portion of short-segment hypotheses 138 into merged hypothesis set 150a comprises concatenated tokenized hypotheses. In some examples, merged hypothesis set 150a comprises a multi-speaker merged hypothesis set. In some examples, merged hypothesis set 150a comprises hypotheses ranks. In some examples, merged hypothesis set 150a is specific to a first speaker of plurality of speakers 106, and so operation 718 further includes merging at least a portion of short-segment hypotheses 138 into merged hypothesis set 150b specific to a second speaker of plurality of speakers 106. Operation 720 includes grouping separate ASR results by speaker.

Operation 722 includes inserting stitching symbols 144 into merged hypothesis set 150a, stitching symbols 144 including a WC symbol (e.g., WC symbol 144a, WCE symbol 144b, and/or WCO symbol 144c). In some examples, operation 722 further includes, based on at least the determined speaker characteristics inserting speaker characteristic tags as stitching symbols 144 into merged hypothesis set 150*a*. In some examples, stitching symbols 144 including at least one symbol selected from the list consisting of: a WC symbol, a WCE symbol, a WCO symbol, an SPKR symbol, an SPKR_k symbol, and a speaker characteristic symbol or value.

In speaker-specific scenarios, operation 722 further includes inserting stitching symbols into merged hypothesis set 150*b*. In some examples, stitching symbols 144 further include a speaker identification (e.g., SPKR_k). In examples using an alignment-based stitcher (see FIG. 4), merged hypothesis set 150*a* comprises an odd hypothesis sequence and an even hypothesis sequence, and operation 724 includes aligning the odd hypothesis sequence with the even hypothesis sequence. In some examples, aligning the odd hypothesis sequence with the even hypothesis sequence comprises pairing words or tokens in the odd sequence with words or tokens in the even sequence.

Operation 726 includes 726 consolidating, with (network-based) hypothesis stitcher 300, merged hypothesis set 150*a* into consolidated hypothesis 160*a*. In some examples, consolidated hypothesis 160*a* comprise tokens representing words. In some examples, consolidated hypothesis 160*a* is specific to a speaker (e.g., one of speakers 106*a*-106*c*. In the situation of speaker-specific consolidated hypotheses 160, operation 726 also includes consolidating, with hypothesis stitcher 300, merged hypothesis set 150*b* into consolidated hypothesis 160*b*, specific to a second speaker.

Operation 728 includes outputting consolidated hypothesis 160*a* as transcription 170. If consolidated hypothesis 160*a* had been a speaker-specific consolidated hypothesis, operations 730-734 are used to produce a multi-speaker version of transcription 170. However, if operation 728 had output multi-speaker version of transcription 170, operation 730-734 may be unnecessary. Operation 730 includes merging consolidated hypothesis 160*a* with consolidated hypothesis 160*b* to generate a multi-speaker version of transcription 170. Operation 732 includes identifying speakers 106*a*-106*c* within the multi-speaker version of transcription 170. Operation 734 includes outputting the multi-speaker version of transcription 170, if operation 728 had only output a speaker-specific version of transcription 170.

FIG. 8 is a flowchart 800 that illustrates exemplary operations involved in performing speech recognition. In some examples, operations described for flowchart 800 are performed by computing device 900 of FIG. 9. Flowchart 800 commences with operation 802, which includes segmenting the audio stream into a plurality of audio segments. Operation 804 includes identifying a plurality of speakers within the audio stream (e.g., within the plurality of audio segments). Operation 806 includes performing ASR on each of the plurality of audio segments to generate a plurality of short-segment hypotheses. Operation 808 includes merging at least a portion of the short-segment hypotheses into a first merged hypothesis set. Operation 810 includes inserting stitching symbols into the first merged hypothesis set, the stitching symbols including a WC symbol. Operation 812 includes consolidating, with a network-based hypothesis stitcher, the first merged hypothesis set into a first consolidated hypothesis.

ADDITIONAL EXAMPLES

An example method of speech recognition comprises: segmenting the audio stream into a plurality of audio segments; identifying a plurality of speakers within the audio stream; performing ASR on each of the plurality of audio segments to generate a plurality of short-segment hypotheses; merging at least a portion of the short-segment hypotheses into a first merged hypothesis set; inserting stitching symbols into the first merged hypothesis set, the stitching symbols including a WC symbol; and consolidating, with a network-based hypothesis stitcher, the first merged hypothesis set into a first consolidated hypothesis.

An example system for speech recognition comprises: a processor; and a computer-readable medium storing instructions that are operative upon execution by the processor to: segmenting the audio stream into a plurality of audio segments; identifying a plurality of speakers within the audio stream; perform ASR on each of the plurality of audio segments to generate a plurality of short-segment hypotheses; merge at least a portion of the short-segment hypotheses into a first merged hypothesis set; insert stitching symbols into the first merged hypothesis set, the stitching symbols including a WC symbol; and consolidate, with a network-based hypothesis stitcher, the first merged hypothesis set into a first consolidated hypothesis.

One or more example computer storage devices has computer-executable instructions stored thereon, which, on execution by a computer, cause the computer to perform operations comprising: segmenting the audio stream into a plurality of audio segments; identifying a plurality of speakers within the audio stream; performing ASR on each of the plurality of audio segments to generate a plurality of short-segment hypotheses; merging at least a portion of the short-segment hypotheses into a first merged hypothesis set; inserting stitching symbols into the first merged hypothesis set, the stitching symbols including a window change (WC) symbol; and consolidating, with a network-based hypothesis stitcher, the first merged hypothesis set into a first consolidated hypothesis.

Alternatively, or in addition to the other examples described herein, examples may include any combination of the following:

outputting the first consolidated hypothesis as a transcription;

the first merged hypothesis set is specific to a first speaker of the plurality of speakers;

the first consolidated hypothesis is specific to the first speaker;

merging at least a portion of the short-segment hypotheses into a second merged hypothesis set specific to a second speaker of the plurality of speakers;

inserting stitching symbols into the second merged hypothesis;

consolidating, with the hypothesis stitcher, the second merged hypothesis set into a second consolidated hypothesis specific to the second speaker;

the first merged hypothesis set comprises a multi-speaker merged hypothesis set;

the stitching symbols further include a speaker identification;

the hypothesis stitcher comprises an alignment-based stitcher;

the first merged hypothesis set comprises an odd hypothesis sequence and an even hypothesis sequence;

aligning the odd hypothesis sequence with the even hypothesis sequence;

the hypothesis stitcher comprises a serialized stitcher that does not use an alignment of odd and even hypothesis sequences;

the hypothesis stitcher uses 25% overlap or less;

the first merged hypothesis set comprises hypotheses ranks;

performing ASR comprises performing E2E ASR;

the short-segment hypotheses and the first consolidated hypothesis comprise tokens representing words;

aligning the odd hypothesis sequence with the even hypothesis sequence comprises pairing words or tokens in the odd sequence with words or tokens in the even sequence;

the hypothesis stitcher comprises an encoder and a decoder;

the hypothesis stitcher comprises a neural network;

the hypothesis stitcher comprises a transformer-based attention encoder decoder architecture.

determining speaker characteristics;

the speaker characteristics are selected from a list consisting of: language, speaker age, and accent;

based on at least the determined speaker characteristics inserting speaker characteristic tags as stitching symbols into the first merged hypothesis set;

the stitching symbols further including at least one symbol selected from the list consisting of: a WCE symbol, a WCO symbol, a SPKR symbol, a numbered speaker symbol, and a speaker characteristic symbol or value;

training the hypothesis stitcher with hypothesis stitcher training data comprising stitching symbols;

inserting errors into the hypothesis stitcher training data;

the inserted errors include an incorrectly identified word in an overlapped region of a segment or an incorrect speaker identification;

the hypothesis stitcher training data has overlaps similar to overlaps in the first merged hypothesis set;

merging at least a portion of the short-segment hypotheses into the first merged hypothesis set comprises concatenated tokenized hypotheses;

merging the first consolidated hypothesis with the second consolidated hypothesis to generate a multi-speaker transcription;

identifying speakers within the multi-speaker transcription;

outputting the multi-speaker transcription;

receiving the audio stream;

the audio segments have a duration of less than a minute; and training the E2E SRE.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
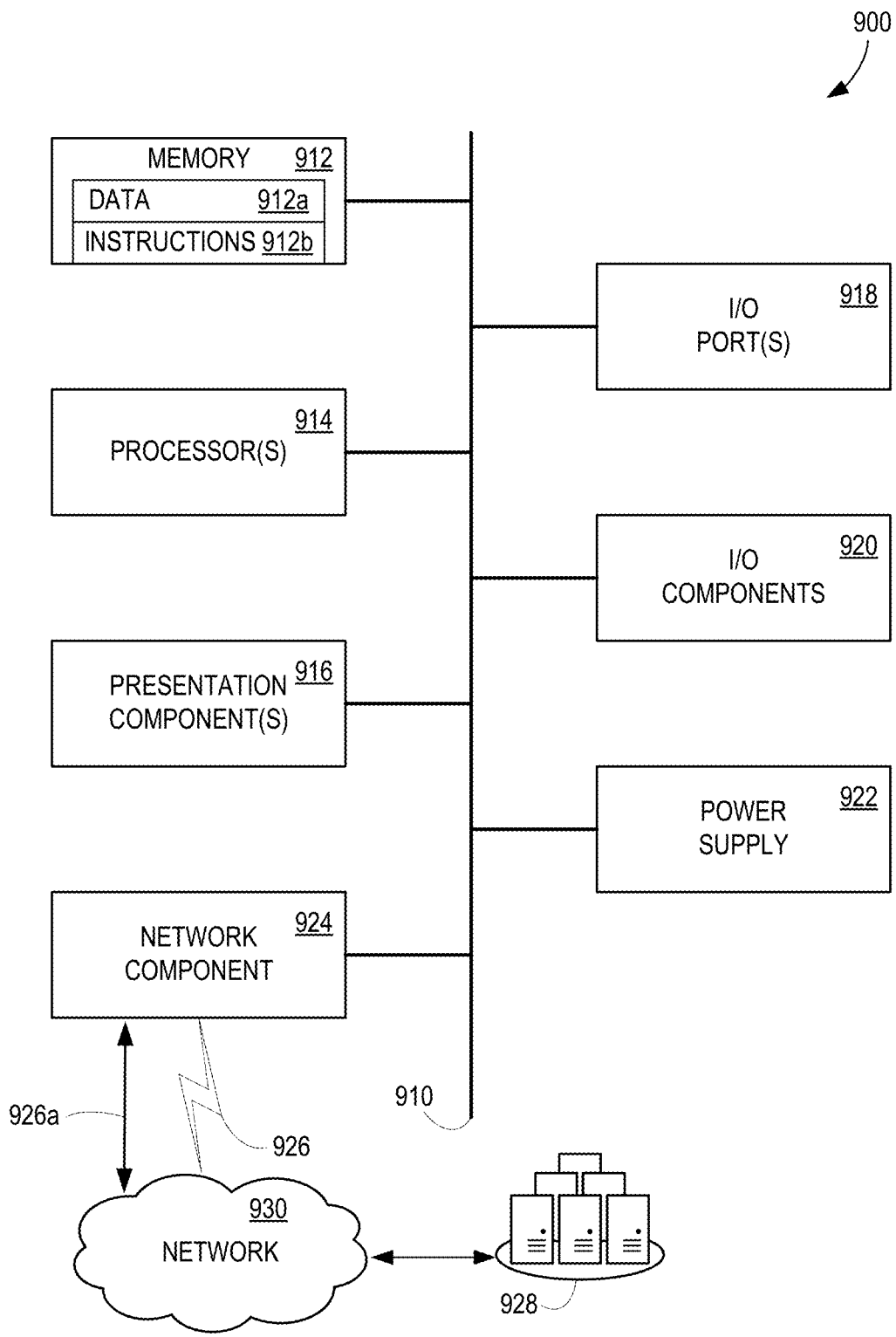
FIG. 9 is a block diagram of an example computing environment suitable for implementing some of the various examples disclosed herein.

FIG. 9 is a block diagram of an example computing device 900 for implementing aspects disclosed herein, and is designated generally as computing device 900. Computing device 900 is but one example of a suitable computing environment and is not intended to suggest any limitation as to the scope of use or functionality of the examples disclosed herein. Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer-storage memory 912, one or more processors 914, one or more presentation components 916, I/O ports 918, I/O components 920, a power supply 922, and a network component 924. While computing device 900 is depicted as a seemingly single device, multiple computing devices 900 may work together and share the depicted device resources. In one example embodiment, memory 912 is distributed across multiple devices, and processor(s) 914 is housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer-storage media references below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer-storage media in the form of volatile and/or nonvolatile memory, removable or non-removable memory, data disks in virtual environments, or a combination thereof. Memory 912 may include any quantity of memory associated with or accessible by the computing device 900. Memory 912 may be internal to the computing device 900 (as shown in FIG. 9), external to the computing device 900 (not shown), or both (not shown). Examples of memory 912 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 900. Additionally, or alternatively, the memory 912 may be distributed across multiple computing devices 900, for example, in a virtualized environment in which instruction processing is carried out on multiple devices 900. For the purposes of this disclosure, "computer storage media," "computer-storage memory," "memory," and "memory devices" are synonymous terms for the computer-storage memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. In one example embodiment, the operations are performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

The computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a cloud resource 928 across network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said"

are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of speech recognition, the method comprising:
   segmenting an audio stream into a plurality of audio segments;
   identifying a plurality of speakers within the audio stream;
   performing automatic speech recognition (ASR) on each of the plurality of audio segments to generate a plurality of short-segment hypotheses;
   merging a first portion of the short-segment hypotheses into a first merged hypothesis set specific to a first speaker of the plurality of speakers;
   merging a second portion of the short-segment hypotheses into a second merged hypothesis set specific to a second speaker of the plurality of speakers, the second speaker different than the first speaker;
   inserting stitching symbols into the first merged hypothesis set and the second merged hypothesis set, the stitching symbols including a window change (WC) symbol; and
   consolidating, with a network-based hypothesis stitcher, the first merged hypothesis set into a first consolidated hypothesis and the second merged hypothesis set into a second consolidated hypothesis.

2. The method of claim 1, further comprising:
   outputting the first consolidated hypothesis as a first transcription and the second consolidated hypothesis as a second transcription.

3. The method of claim 1, wherein the first merged hypothesis set is specific to a first speaker of the plurality of speakers, wherein the first consolidated hypothesis is specific to the first speaker.

4. The method of claim 1, wherein the first merged hypothesis set comprises a multi-speaker merged hypothesis set, and wherein the stitching symbols further include a speaker identification.

5. The method of claim 1, wherein the hypothesis stitcher comprises an alignment-based stitcher, wherein the first merged hypothesis set comprises an odd hypothesis sequence and an even hypothesis sequence, and wherein the method further comprises:
   aligning the odd hypothesis sequence with the even hypothesis sequence.

6. The method of claim 1, wherein the hypothesis stitcher comprises a serialized stitcher that does not use an alignment of odd and even hypothesis sequences.

7. The method of claim 6, wherein the hypothesis stitcher uses 25% overlap or less.

8. A system for speech recognition, the system comprising:
   a processor; and
   a computer-readable medium storing instructions that are operative upon execution by the processor to:
      segment an audio stream into a plurality of audio segments;
      identify a plurality of speakers within the audio stream;
      perform automatic speech recognition (ASR) on each of the plurality of audio segments to generate a plurality of short-segment hypotheses;
      merge a first portion of the short-segment hypotheses into a first merged hypothesis set specific to a first speaker of the plurality of speakers;
      merging a second portion of the short-segment hypotheses into a second merged hypothesis set specific to a second speaker of the plurality of speakers, the second speaker different than the first speaker;
      insert stitching symbols into the first merged hypothesis set and the second merged hypothesis set, the stitching symbols including a window change (WC) symbol; and
      consolidate, with a network-based hypothesis stitcher, the first merged hypothesis set into a first consolidated hypothesis and the second merged hypothesis set into a second consolidated hypothesis.

9. The system of claim 8, wherein the first merged hypothesis set comprises hypotheses ranks.

10. The system of claim 8, wherein the first merged hypothesis set is specific to a first speaker of the plurality of speakers, wherein the first consolidated hypothesis is specific to the first speaker.

11. The system of claim 8, wherein the first merged hypothesis set comprises a multi-speaker merged hypothesis set, and wherein the stitching symbols further include a speaker identification.

12. The system of claim 8, wherein the hypothesis stitcher comprises an alignment-based stitcher, wherein the first merged hypothesis set comprises an odd hypothesis sequence and an even hypothesis sequence, and wherein the instructions are further operative to:
   align the odd hypothesis sequence with the even hypothesis sequence.

13. The system of claim 8, wherein the hypothesis stitcher comprises a serialized stitcher that does not use an alignment of odd and even hypothesis sequences.

14. The system of claim 13, wherein the hypothesis stitcher uses 25% overlap or less.

15. One or more computer storage devices having computer-executable instructions stored thereon, which, on execution by a computer, cause the computer to perform operations comprising:
   segmenting an audio stream into a plurality of audio segments;
   identifying a plurality of speakers within the audio stream;
   performing automatic speech recognition (ASR) on each of the plurality of audio segments to generate a plurality of short-segment hypotheses;
   merging a first portion of the short-segment hypotheses into a first merged hypothesis set specific to a first speaker of the plurality of speakers;
   merging a second portion of the short-segment hypotheses into a second merged hypothesis set specific to a second speaker of the plurality of speakers, the second speaker different than the first speaker;

inserting stitching symbols into the first merged hypothesis set and the second merged hypothesis set, the stitching symbols including a window change (WC) symbol; and consolidating, with a network-based hypothesis stitcher, the first merged hypothesis set into a first consolidated hypothesis and the second merged hypothesis set into a second consolidated hypothesis.

16. The one or more computer storage devices of claim 15, wherein the operations further comprise:
    outputting the first consolidated hypothesis as a first transcription and the second consolidated hypothesis as a second transcription.

17. The one or more computer storage devices of claim 15, wherein the first merged hypothesis set is specific to a first speaker of the plurality of speakers, wherein the first consolidated hypothesis is specific to the first speaker.

18. The one or more computer storage devices of claim 15, wherein the first merged hypothesis set comprises a multi-speaker merged hypothesis set, and wherein the stitching symbols further include a speaker identification.

19. The one or more computer storage devices of claim 15, wherein the hypothesis stitcher comprises an alignment-based stitcher, wherein the first merged hypothesis set comprises an odd hypothesis sequence and an even hypothesis sequence, and wherein the operations further comprise:
    aligning the odd hypothesis sequence with the even hypothesis sequence.

20. The one or more computer storage devices of claim 15, wherein the hypothesis stitcher comprises a serialized stitcher that does not use an alignment of odd and even hypothesis sequences.

\* \* \* \* \*